United States Patent
Volentine et al.

(10) Patent No.: US 7,681,023 B2
(45) Date of Patent: Mar. 16, 2010

(54) METHOD FOR ENSURING OPTIMAL MEMORY CONFIGURATION IN A COMPUTER

(75) Inventors: Robert J. Volentine, Houston, TX (US); Mark A. Piwonka, Tomball, TX (US); Patrick L. Gibbons, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1103 days.

(21) Appl. No.: 10/836,574

(22) Filed: Apr. 30, 2004

(65) Prior Publication Data

US 2005/0246517 A1 Nov. 3, 2005

(51) Int. Cl.
*G06F 9/00* (2006.01)
*G06F 15/177* (2006.01)
*G06F 12/06* (2006.01)
*G06F 13/00* (2006.01)
*G06F 13/28* (2006.01)

(52) U.S. Cl. .................... 713/1; 713/2; 713/100; 711/5; 711/115; 711/157

(58) Field of Classification Search .................... 713/1, 713/2, 100; 711/5, 115, 157
See application file for complete search history.

(56) References Cited

U.S. PATENT DOCUMENTS

| 5,960,462 | A  | * | 9/1999 | Solomon et al. | ............ 711/157 |
| 6,226,720 | B1 | * | 5/2001 | Henderson et al. | .......... 711/157 |
| 6,356,986 | B1 | * | 3/2002 | Solomon et al. | ............ 711/157 |
| 6,590,781 | B2 | * | 7/2003 | Kollipara et al. | ............ 361/760 |
| 6,792,561 | B1 | * | 9/2004 | Mamata | ....................... 714/36 |
| 7,024,547 | B2 | * | 4/2006 | Kartoz | .......................... 713/1 |
| 7,096,349 | B1 | * | 8/2006 | Hamilton | ....................... 713/1 |
| 2003/0023841 | A1 | * | 1/2003 | Atherton et al. | ................ 713/1 |
| 2004/0064686 | A1 | * | 4/2004 | Miller et al. | .................... 713/1 |

OTHER PUBLICATIONS

Intel Dual-Channel DDR Memory Architecture White Paper, Infineon Technologies North America Corporation and Kingston Technology Compay, Inc., Sep. 2003, pp. 1-14.*

* cited by examiner

*Primary Examiner*—Thomas Lee
*Assistant Examiner*—Stefan Stoynov

(57) ABSTRACT

A method according to the invention ensures optimal memory configuration in a computer: A determination is made whether performance can be improved by rearranging the DIMMs that are installed in the computer. If so, then a user of the computer is notified that the DIMMs can be rearranged to improve performance.

20 Claims, 3 Drawing Sheets

METHOD FOR ENSURING OPTIMAL MEMORY CONFIGURATION IN A COMPUTER

FIELD OF THE INVENTION

This invention relates generally to computer systems, and more particularly to memory configuration in computer systems.

BACKGROUND

In most computer systems, a memory controller provides an interface between main memory and many of the other components of the system including the CPU. Such a memory controller typically is responsible for handling data flow to and from main memory and governs support for different types, sizes and speeds of memory devices. For many years, most memory controllers were of the single-channel variety. Recently, however, dual-channel memory controllers have risen in popularity. Dual-channel memory controllers typically support similar types, sizes and speeds of memory devices as did single-channel controllers, but dual-channel controllers increase bandwidth by adding a second data path to and from the devices.

While dual-channel controllers provide a performance benefit relative to single-channel controllers, they also impose certain limitations on memory configuration: Usually, dual-channel memory controllers require that the slots of channel A be populated identically with the slots in channel B. In other words, if a slot in channel A is populated with a dual inline memory module ("DIMM") having certain size and speed characteristics, then the corresponding slot in channel B must be populated with a DIMM having the same size and speed characteristics as that in channel A. If not, then either the system will hang or the memory controller will default to single-channel operation. Either result deteriorates system performance.

SUMMARY OF THE INVENTION

A method according to a preferred embodiment of the invention ensures optimal memory configuration in a computer.

In one aspect, a determination is made whether performance can be improved by rearranging the DIMMs that are installed in the computer. If so, then a user of the computer is notified that the DIMMs can be rearranged to improve performance.

In another aspect, during a first boot procedure, the computer detects that a hardware configuration or a DIMM slot population state has changed since a previous boot procedure. The computer then detects that the DIMMs in the computer can be rearranged to improve performance. The computer then displays a message indicating that performance can be improved by rearranging the DIMMs.

In another aspect, during a second boot procedure, the computer detects that no hardware configuration or DIMM slot population state has changed since the first boot procedure and displays the message again.

In another aspect, during a third boot procedure, the computer detects that no hardware configuration or DIMM slot population state has changed since the second boot procedure and does not display the message again until a hardware configuration or DIMM slot population state change is detected during a subsequent boot procedure.

DETAILED DESCRIPTION OF THE PREFERRED EMBODIMENTS

Figure 1:
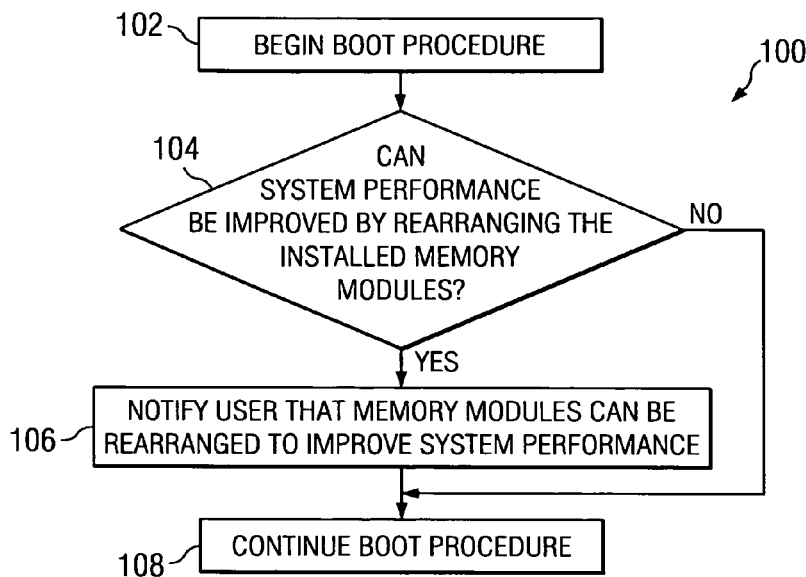
FIG. 1 is a flow diagram illustrating a method according to a first preferred embodiment of the invention for ensuring optimal memory configuration in a computer.

Referring now to FIG. 1, a method 100 according to a preferred embodiment of the invention ensures optimal memory configuration in a computer. In step 102, the computer begins a boot procedure. A boot procedure is defined herein to mean everything that happens from the time when the computer is turned on or is reset to the time when a user's desired operating system is loaded and running. At some point during the boot procedure, the computer determines in step 104 whether performance can be improved by rearranging the DIMMs that are currently installed in the computer. For example, if the computer is currently operating in single-channel mode, but the installed DIMMs could function in a dual-channel mode if they were installed in different DIMM slots, then the computer may conclude that performance can be improved by rearranging the installed DIMMs. If the computer concludes in step 104 that performance can be improved by rearranging the installed DIMMs, then it notifies a user accordingly in step 108. The computer may notify the user in any appropriate manner, such as by presenting a message on a monitor of the computer. If the DIMMs cannot be rearranged to improve performance, then notification does not occur. In either case, the computer may continue the boot procedure at step 108. In one embodiment, basic input/output services ("BIOS") firmware performs the steps illustrated in FIG. 1. In alternative embodiments, other software or hardware systems may be employed to perform the method.

Figure 2:
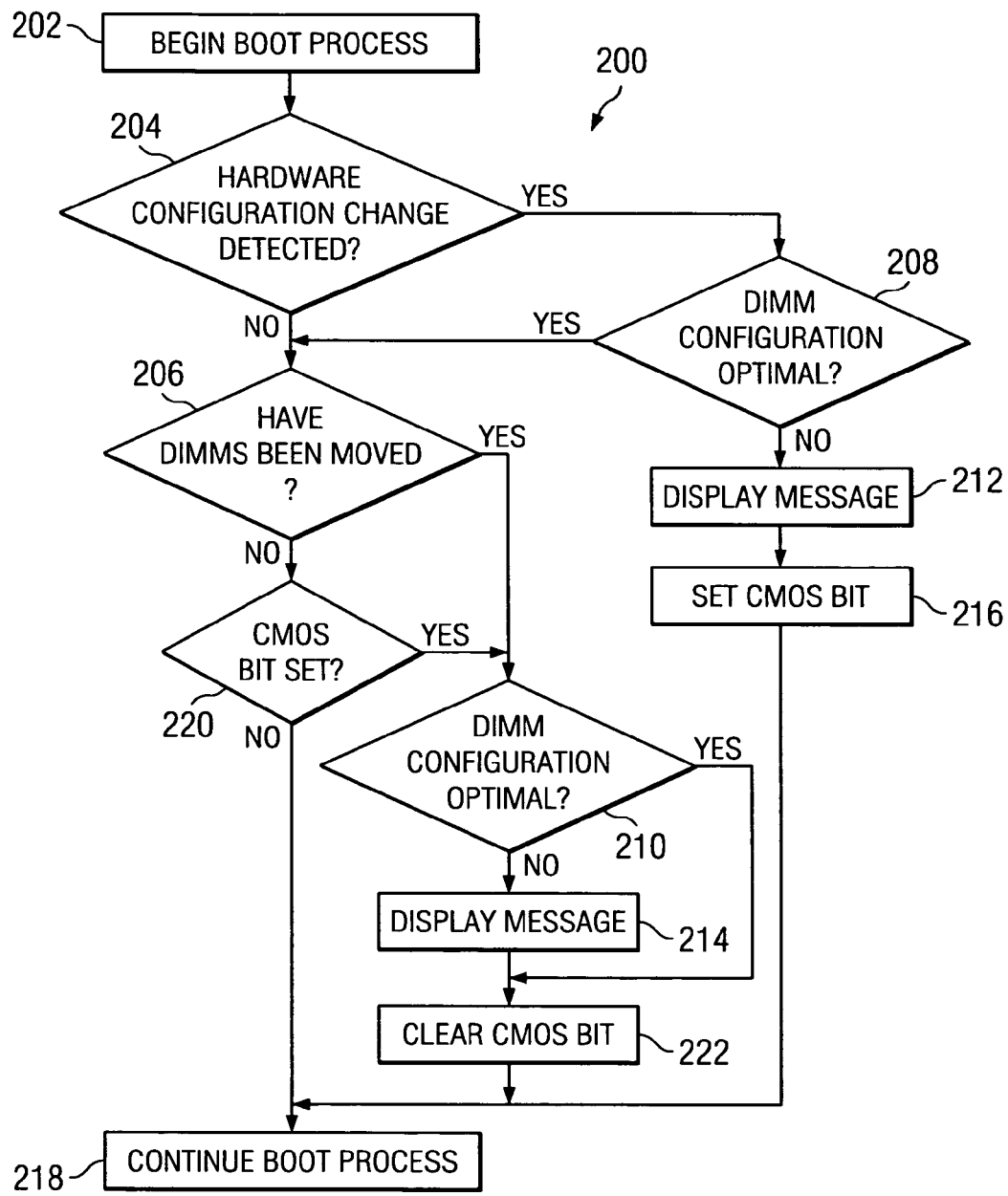
FIG. 2 is a flow diagram illustrating a method according to a second preferred embodiment of the invention for ensuring optimal memory configuration in a computer.
Figure 3:
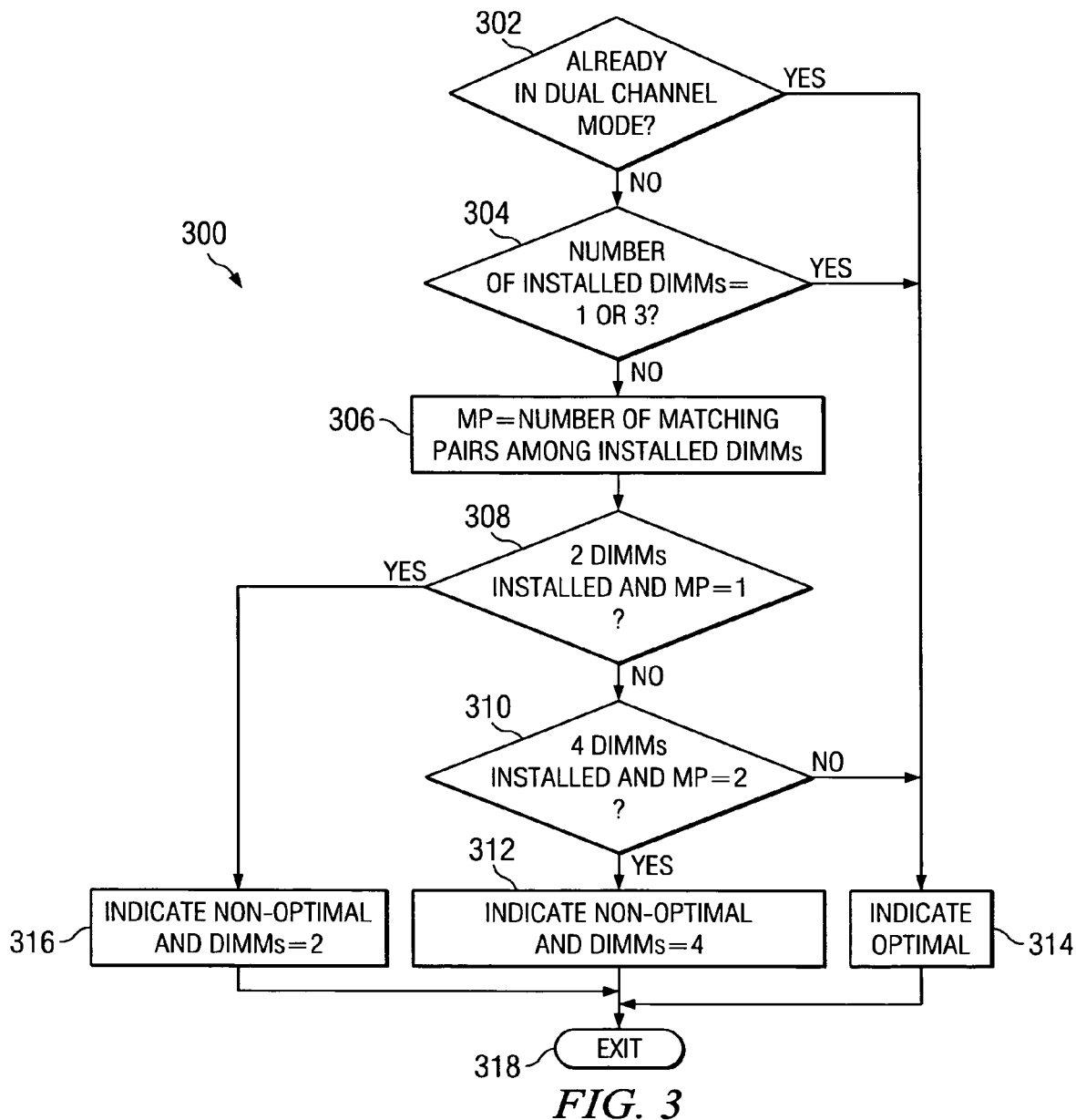
FIG. 3 is a flow diagram illustrating a preferred method of determining whether the DIMMs installed in a computer are arranged optimally.

FIGS. 2 and 3 illustrate another preferred embodiment of the invention. In step 200 (see FIG. 2), the computer begins a boot procedure. At some point during the boot procedure, the computer may determine in step 204 whether a hardware configuration in the computer has changed since the previous boot procedure occurred. A hardware configuration change is defined herein to mean any substantive change in installed hardware or substantive change in the configuration of installed hardware—such as, for example, installation or removal of a hard drive, adapter card or the like. Detection of such a change may be implemented using a variety of techniques, including conventional techniques commonly employed in BIOS firmware.

If a hardware configuration change is not detected in step 204, then the computer may determine in step 206 whether a DIMM slot population state change has occurred. A DIMM slot population state change is defined herein to include a DIMM slot becoming populated whereas before it was unpopulated, or becoming unpopulated whereas before it was populated. A DIMM slot population state change also includes a DIMM slot becoming populated with a DIMM having first characteristics whereas before it was populated with a DIMM having second characteristics, and wherein the first and second characteristics differ. A DIMM slot population state change may or may not constitute a hardware configuration change.

If either a hardware configuration change or a DIMM slot population state change is detected in steps 204 or 206, then the computer may determine in step 208 or step 210 whether the DIMMs in the computer can be rearranged to improve performance—again, for example, by causing the computer to run in dual-channel mode rather than in single-channel mode.

The determination made in steps 208 and 210 may be implemented in a variety of ways. One preferred way is illustrated by the method 300 of FIG. 3. In method 300, the computer first determines in step 302 whether it is already operating in dual-channel mode. If so, then a performance improvement cannot be gained simply by rearranging the installed DIMMs. Therefore, the method indicates (by any suitable means) in step 314 that the current memory configuration is optimal and returns in step 318. But if the computer is not already in dual-channel mode, then the method determines in step 304 how many DIMMs are currently installed. If the number is odd (for example, 1 or 3), then dual-channel mode would not be possible. So again, the method would indicate in step 314 that the current memory configuration is optimal and would return in step 318.

In step 306, the method determines how many matching pairs of DIMMs exist among the installed DIMMs. This determination may be made in a variety of ways. One preferred way is to access the information stored in the serial presence detect ("SPD") bytes of the installed DIMMs. Specifically, four of the SPD bytes may be compared among the DIMMs: number of rows, number of columns, number of sides, and width. If this information is byte-for-byte equal as between two DIMMs being compared, then the method may conclude that the two DIMMs constitute a matching pair for the purposes of dual-channel memory operation.

Figure 4:
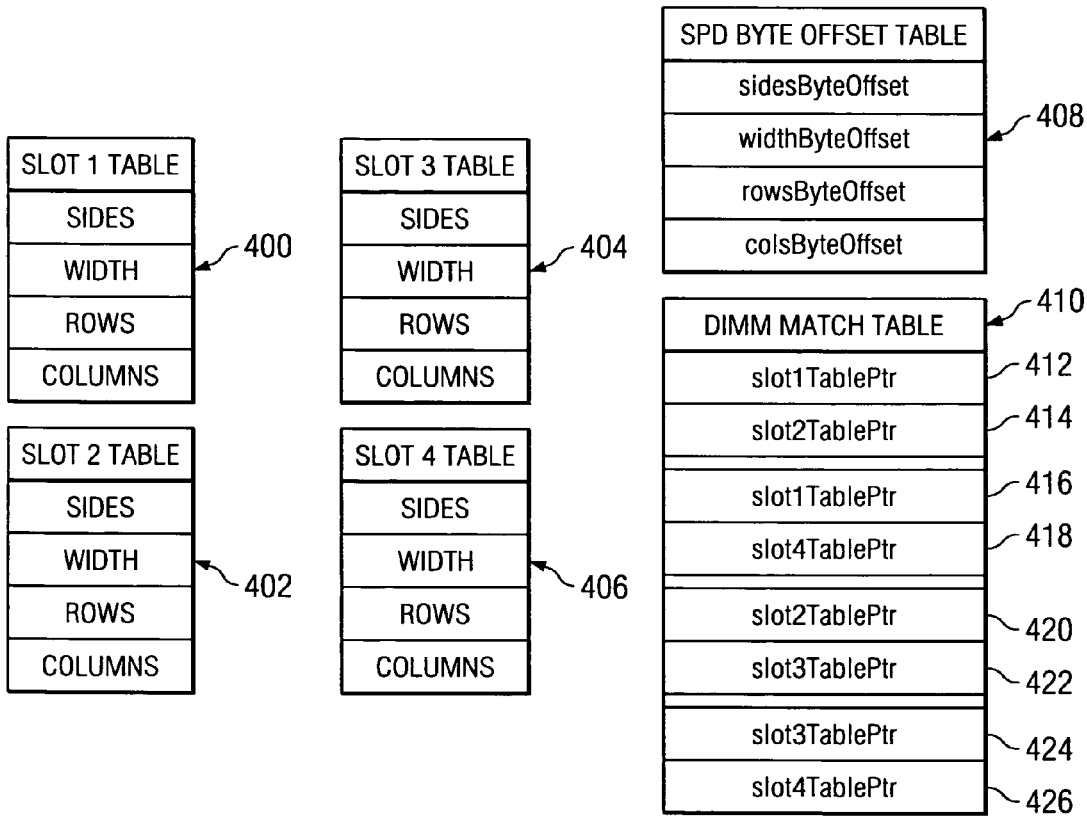
FIG. 4 is a block diagram illustrating several data structures that may be used in a preferred method for determining how many matching pairs of DIMMs exist among the installed DIMMs in a computer.

Although numerous techniques may be employed to determine the number of matching pairs of DIMMs that exist among the installed DIMMs, FIG. 4 is included herein to illustrate a preferred method for doing so. One table may be allocated for each of the DIMM slots of the computer. In the illustration, tables 400-406 are allocated for each of the DIMM slots in a 4-slot computer. (More or fewer tables can be allocated for computers having more or fewer DIMM slots.) Each of the tables 400-406 contains space to hold the values of the SPD bytes that will be compared. In the illustrated example, 4 SPD bytes will be compared, so space is allocated for 4 bytes of information in each table: the number of sides on the DIMM, the width of the DIMM (×8 or ×16, for example), the number of row addresses on the DIMM, and the number of column addresses on the DIMM. Populating tables 400-406 can be facilitated by providing an SPD byte offset table 408 containing the offsets within a DIMM's SPD byte array of the specific SPD bytes of interest. In the example shown, table 408 contains the offsets for the 4 SPD bytes just described. Tables 400-406 may be populated by sequencing through each of the DIMM slots in the computer and, for each populated slot, copying the values found at the offsets listed in table 408 into the appropriate locations of tables 400-406. For implementations comparing more or fewer SPD bytes to determine a match, tables 400-408 maybe made larger or smaller.

A DIMM match table 410 may be used to facilitate determining the number of matching DIMM pairs using tables 400-406. Table 410 maybe loaded with pointers to tables 400-406 in various combinations. (An example set of combinations is shown by entries 412-426.) Once this had been done, the number of matching DIMM pairs can be determined simply by walking table 410 and considering its entries two at a time: Considering entries 412 and 414 would lead to a comparison of the information in tables 400 and 402. Considering entries 416 and 418 would lead to a comparison of the information in tables 400 and 406, and so on. For each set of tables compared, a match counter may be incremented or not depending on the outcome of the comparison. Once table 410 has been traversed, the value of the match counter will indicate the number of matches found among the tested pairs. Depending on the application and the characteristics of the host computer, table 410 may be implemented to contain more of fewer pairs of pointers, and the slot pairs indicated by the table may be varied as appropriate.

The results of step 306 are used in steps 308 and 310. In step 308, method 300 determines whether the number of installed DIMMs equals 2 and whether the number of matching pairs found equals 1. If so, then dual-channel operation is possible, and the method indicates so in step 316 and returns in step 318. If not, then the method determines in step 310 whether the number of installed DIMMs equals 4 and whether the number of matching pairs found equals 2. If so, then again dual-channel operation is possible. The method would indicate so in step 312 and would return in step 318. But if not, then dual-channel operation is not possible, so the method would indicate in step 314 that the current memory configuration is optimal and would return in step 318.

Referring again to FIG. 2, if it is determined that the current memory configuration is non-optimal, then method 200 may notify the computer user in steps 212 or 214. Such notification may be accomplished in any suitable manner. In a preferred embodiment, the method may present one of two messages depending on the values indicated by method 300. If the number of DIMMs installed equals 2 and the number of matching pairs equals 1, then the method may present a message to the user such as: "Populated DIMM configuration is unbalanced. For maximum performance, place both DIMMs in the two black DIMM slots." If the number of DIMMs installed equals 4 and the number of matching pairs equals 2, then the message might be, for example: "Populated DIMM configuration is unbalanced. For maximum performance, swap one DIMM in a blue slot with one in a black slot." The actual content of the messages may vary as appropriate, or course, given the context in which the invention is deployed and given the nature of the host computer.

In another aspect of the invention, the notification messages maybe presented more than once if the user seems not to have responded to a first notification message, and then may be suppressed thereafter to avoid annoying the user. For example, assume a notification message was presented during a first boot procedure. Then, after the computer has been rebooted and a second boot procedure is in progress, the computer may detect that no hardware configuration has changed and that no DIMM slot population states have changed since the first boot procedure. If so, then the method may issue a notification message one more time to ensure that the user has seen it and has had an opportunity to respond. But if the computer is rebooted a third time and the third boot procedure detects no hardware configuration or DIMM slot population state changes, then the notification message may be suppressed until a hardware configuration or DIMM slot population state change is detected on a subsequent boot.

This functionality may be implemented in a variety of ways. In the example of FIG. 2, it may be implemented by keeping one bit of state information in a non-volatile memory location such as in CMOS. Specifically, method 200 may set a CMOS bit during a first boot procedure in step 216 if a hardware configuration change is detected in step 204 and the memory configuration is found to be non-optimal in step 208. The first boot procedure may then continue in step 218. Then, during a second boot procedure, the CMOS bit may be tested in step 220 if no hardware configuration change is detected in step 204 and no DIMM slot population state changes are detected in step 206. If the CMOS bit is set, then the method will display the message a second time in step 214. But the method will then clear the CMOS bit in step 222 so that the message will not be displayed again during a third or during subsequent boot procedures until a hardware configuration change or a DIMM slot population state change does occur.

As in the case of the method of FIG. 1, in a preferred embodiment the BIOS firmware will perform the methods of FIGS. 2 and 3. In alternative embodiments, the methods may be performed by other hardware or software mechanisms.

While the invention has been described in detail with reference to preferred embodiments thereof, the described embodiments have been presented by way of example and not by way of limitation. It will be understood by those skilled in the art that various changes may be made in the form and details of the described embodiments without deviating from the spirit and scope of the invention as defined by the appended claims.

What is claimed is:

1. A method of ensuring optimal memory configuration in a computer, comprising:
   during a boot procedure,
   detecting that a hardware configuration has changed since a previous boot procedure, and:
     determining whether performance can be improved by rearranging DIMMs that are installed in the computer by at least moving an installed DIMM from a first slot to a second slot; and, if so:
       changing a status of a non-volatile bit to control a detection of the DIMM slot population state during a subsequent boot procedure; and
       notifying a user of the computer that the installed DIMMs can be rearranged to improve performance.

2. Storage media containing program code operable to cause a computer to perform a method of ensuring optimal memory configuration in the computer, the method comprising:
   during a boot procedure:
   detecting that a hardware configuration has changed since a previous boot procedure;
   determining whether performance can be improved by rearranging DIMMs that are installed in the computer by at least moving an installed DIMM from a first slot to a second slot; and if so:
     changing a status of a bit in a non-volatile memory to control a detection of the DIMM slot population state during a subsequent boot procedure; and
     notifying a user of the computer that the installed DIMMs can be rearranged to improve performance.

3. A method of ensuring optimal memory configuration in a computer having DIMMs, comprising:
   during a first boot procedure:
   detecting that a hardware configuration or a DIMM slot population state has changed since a previous boot procedure;
   detecting that the DIMMs in the computer can be rearranged to improve performance; by at least moving an installed DIMM from a first slot to a second slot;
   displaying a message indicating that performance can be improved by rearranging the DIMMs; and
   changing the status of a non-volatile bit to control a detection of the DIMM slot population state during a subsequent boot procedure.

4. The method of claim 3, further comprising:
   during a second boot procedure:
   detecting that no hardware configuration or DIMM slot population state has changed since the first boot procedure; and
   displaying the message again.

5. The method of claim 4, further comprising:
   during a third boot procedure:
   detecting that no hardware configuration or DIMM slot population state has changed since the second boot procedure; and
   not displaying the message again until a hardware configuration or DIMM slot population state change is detected during a subsequent boot procedure.

6. Storage media containing program code operable to cause a computer having DIMMs to perform a method of ensuring optimal memory configuration in the computer, the method comprising:
   during a first boot procedure:
   detecting that a hardware configuration or a DIMM slot population state has changed since a previous boot procedure;
   detecting that the DIMMs in the computer can be rearranged to improve performance by at least moving an installed DIMM from a first slot to a second slot;
   displaying a message indicating that performance can be improved by rearranging the DIMMs; and
   changing the status of a non-volatile bit to control a detection of the DIMM slot population state during a subsequent boot prodecure.

7. The storage media of claim 6, wherein the method further comprises:
   during a second boot procedure:
   detecting that no hardware configuration or DIMM slot population state has changed since the first boot procedure; and
   displaying the message again.

8. The storage media of claim 7, wherein the method further comprises:
   during a third boot procedure:
   detecting that no hardware configuration or DIMM slot population state has changed since the second boot procedure; and
   not displaying the message again until a hardware configuration or DIMM slot population state change is detected during a subsequent boot procedure.

9. A method of ensuring optimal memory configuration in a computer having DIMMs, comprising:
   detecting if a DIMM slot population state has changed; if not,
   detecting if a non-volatile bit is set; if so:
   detecting that the DIMMs in the computer can be rearranged to improve performance by at least moving an installed DIMM from a first slot to a second slot;
   displaying a message indicating that performance can be improved by rearranging the DIMMs; and
   clearing the non-volatile bit.

10. The method of claim 9, wherein detecting that the DIMMs in the computer can be rearranged to improve performance comprises:
    determining a number of matching DIMM pairs installed in the computer.

11. The method of claim 10, wherein determining a number of matching DIMM pairs installed in the computer comprises:
- creating one slot table for each DIMM slot in the computer;
- populating each slot table with one or more values from SPD bytes of a DIMM that is installed in a DIMM slot corresponding to the slot table;
- creating a DIMM match table;
- populating the DIMM match table with pairs of pointers to the slot tables; and
- for each pair of pointers in the DIMM match table, comparing the values in the slot tables indicated by the pair of pointers.

12. The method of claim 11, wherein populating each slot table comprises:
- retrieving SPD bytes from a DIMM responsive to offset information stored in an SPD byte offset table.

13. Storage media containing program code operable to cause a computer having DIMMs to perform a method of ensuring optimal memory configuration in the computer, the method comprising:
- detecting that a hardware configuration has changed;
- detecting that a DIMM slot population state has changed;
- detecting that the DIMMs in the computer can be rearranged to improve performance by at least moving an installed DIMM from a first slot to a second slot and, if so, changing a status of a non-volatile bit; and
- displaying a message indicating that performance can be improved by rearranging the DIMMs.

14. The storage media of claim 13, wherein detecting that the DIMMs in the computer can be rearranged to improve performance comprises:
- determining a number of matching DIMM pairs installed in the computer.

15. The storage media of claim 14, wherein determining a number of matching DIMM pairs installed in the computer comprises:
- creating one slot table for each DIMM slot in the computer;
- populating each slot table with one or more values from SPD bytes of a DIMM that is installed in a DIMM slot corresponding to the slot table;
- creating a DIMM match table; populating the DIMM match table with pairs of pointers to the slot tables; and
- for each pair of pointers in the DIMM match table, comparing the values of the slot tables indicated by the pair of pointers.

16. The storage media of claim 15, wherein populating each slot table comprises:
- retrieving SPD bytes from a DIMM responsive to offset information stored in an SPD byte offset table.

17. A method of ensuring optimal memory configuration in a computer having DIMMs, comprising:
- during a first boot procedure:
  - detecting that a hardware configuration or a DIMM slot population state has changed since a previous boot procedure;
  - detecting that the DIMMs in the computer can be rearranged to improve performance by at least moving an installed DIMM from a first slot to a second slot; and
  - displaying a message indicating that performance can be improved by rearranging the DIMMs;
- during a second boot procedure:
  - detecting that no hardware configuration or DIMM slot population state has changed since the first boot procedure; and
  - displaying the message again.

18. A method of ensuring optimal memory configuration in a computer, comprising:
- detecting that a hardware configuration has changed;
- determining whether performance can be improved by rearranging DIMMs that are installed in the computer by at least moving an installed DIMM from a first slot to a second slot, and, if so:
  - changing the status of a non-volatile bit to control a detection of the DIMM slot population state during a subsequent boot procedure; and
  - notifying a user of the computer that the installed DIMMs can be rearranged to improve performance.

19. A method of ensuring optimal memory configuration in a computer, comprising:
- during a boot procedure:
- detecting whether a hardware configuration has changed since a previous boot procedure, and if the hardware configuration has changed:
  - determining whether performance can be improved by rearranging DIMMs that are installed in the computer by at least moving an installed DIMM from a first slot to a second slot;
  - notifying a user of the computer that the installed DIMMs can be rearranged to improve performance; and
  - setting a non-volatile bit; and
- if the hardware configuration has not changed:
  - determining if a DIMM slot population has changed, and, if so:
  - determining whether performance can be improved by rearranging the DIMMs by at least moving an installed DIMM from the first slot to the second slot;
  - notifying a user of the computer that the installed DIMMs can be rearranged to improve performance; and
  - clearing the non-volatile bit.

20. A method of ensuring optimal memory configuration in a computer, comprising:
- during a boot procedure, detecting whether a hardware configuration has changed since a previous boot procedure;
- determining whether a non-volatile bit is set, and if the non-volatile bit is set:
  - determining whether performance can be improved by rearranging DIMMs that are installed in the computer by at least moving an installed DIMM from a first slot to a second slot;
  - notifying a user of the computer that the installed DIMMs can be rearranged to improve performance; and
  - clearing the non-volatile bit; and
- if the non-volatile bit is not set, continuing with a boot procedure.

* * * * *

UNITED STATES PATENT AND TRADEMARK OFFICE
CERTIFICATE OF CORRECTION

PATENT NO. : 7,681,023 B2 Page 1 of 1
APPLICATION NO. : 10/836574
DATED : March 16, 2010
INVENTOR(S) : Robert J. Volentine et al.

It is certified that error appears in the above-identified patent and that said Letters Patent is hereby corrected as shown below:

In column 3, line 59, delete "maybe" and insert -- may be --, therefor.

In column 3, line 63, delete "maybe" and insert -- may be --, therefor.

In column 4, line 43, delete "maybe" and insert -- may be --, therefor.

In column 5, line 61, in Claim 3, delete "performance;" and insert -- performance --, therefor.

In column 6, line 21, in Claim 6, after "that" insert -- if --, therefor.

In column 6, line 32, in Claim 6, delete "prodecure." and insert -- procedure. --, therefor.

Signed and Sealed this

Fifteenth Day of June, 2010

David J. Kappos
*Director of the United States Patent and Trademark Office*